United States Patent Office 2,937,166
Patented May 17, 1960

2,937,166
AZO-DYESTUFFS INSOLUBLE IN WATER

Herbert Kracker, Hans Albert, and Walter Staab, all of Offenbach am Main, Germany, assignors to Farbwerke Hoechst Aktiengesellschaft vormals Meister Lucius & Bruning, Frankfurt am Main, Germany, a corporation of Germany No Drawing. Application July 1, 1958
Serial No. 745,819

Claims priority, application Germany July 6, 1957

6 Claims. (Cl. 260—158)

The present invention relates to new azo-dyestuffs insoluble in water and to a process for preparing the same; more particularly it relates to dyestuffs corresponding to the following general formula

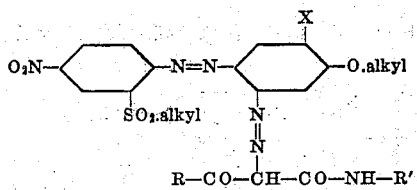

R—CO—CH—CO—NH—R' wherein X represents an alkyl or alkoxy group, R represents an alkyl or aryl radical and R' stands for an aromatic or heterocyclic radical free from groups imparting solubility in water.

In U.S. patent application Serial No. 667,961, filed June 25, 1957, in the name of Herbert Kracker and Hans Albert is disclosed a process for the manufacture of azo-dyestuffs insoluble in water, wherein the diazonium compound from an ortho-amino-azo compound of the general formula

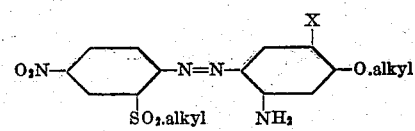

in which X represents an alkyl or alkoxy group, is coupled in substance, on the fiber or on another substratum with an arylamide of 2,3-hydroxynaphthoic acid which is free from groups imparting solubility in water. According to this process, greenish-brown to green dyestuffs are obtained which are distinguished by good properties of fastness.

Now, we have found that dyestuffs of similar good fastness properties are obtained by coupling in substance, on the fiber or on another substratum the diazonium compound from an ortho-amino-azo compound of the general formula

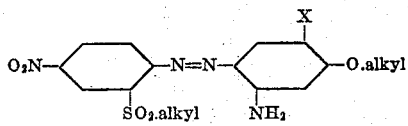
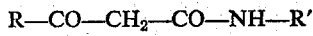

in which X represents an alkyl or alkoxy group, with an arylamide of a β-keto-carboxylic acid of the general formula

R—CO—CH₂—CO—NH—R' in which R represents an alkyl or aryl radical and R' stands for an aromatic or heterocyclic radical free from groups imparting solubility in water.

The new dyestuffs yield according to known dyeing and printing methods mainly green, brown and black tints. The process is particularly valuable for the production of insoluble azo-dyestuffs by printing since, in addition to yellow and red to claret tints, there can also be obtained green and black tints which could not be produced hitherto in practice with the use of arylamides of β-keto-carboxylic acids.

The new dyestuffs possess in many cases a good fastness to light and to wet-processing and represent, therefore, a valuable enrichment of the class of ice-colors.

The following examples serve to illustrate the invention but they are not intended to limit it thereto:

Example 1

Cotton fabric is padded on the foulard with the following solution:

33.8 grams of 2-acetoacetylamino-6-ethoxybenzthiazole are pasted up with
34 cc. of denatured alcohol,
17 cc. of warm water and
7 cc. of a sodium hydroxide solution of 38° Bé, and made up to 1 liter with water of 50–60° C. and
20 cc. of Monopol Brilliant oil.

The dried fabric is developed on the foulard with a solution containing per liter of water 14.7 grams of 2-amino-4,5-diethoxy-2'-methylsulfonyl-4'-nitro-1,1'-azobenzene in the form of a diazonium compound prepared in the usual manner,
1 gram of a reaction product from about 20 mols of ethylene oxide and 1 mol of octodecyl alcohol, and
20 cc. of acetic acid of 50 percent strength.

After an air-passage of about 30 seconds and a hot water passage at 80–90° C., the material is rinsed hot and cold, soaped for 20 minutes in the usual manner, rinsed again and dried. A covered green tint is obtained. The dyestuff corresponds to the following formula

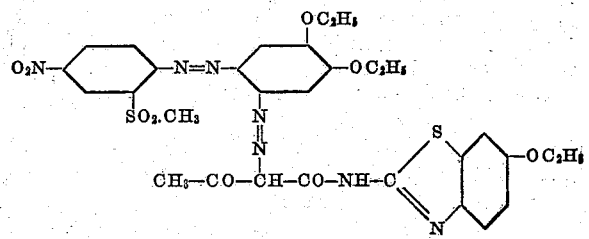

Example 2

Cotton fabric is padded on the foulard with the following solution:

14 grams of 1-acetoacetylamino-2,5-dimethoxy-4-chlorobenzene are pasted up with
20 cc. of Monopol Brilliant oil and
10 cc. of a sodium hydroxide solution of 38° Bé, and then dissolved by the addition of
350 cc. of boiling water. The whole is made up to 1 liter with cold water.

The dried fabric is printed with a printing paste containing per kilogram 14.7 grams of 2-amino-4,5-diethoxy-2'-methylsulfonyl-4'-nitro-1,1'-azobenzene in the form of a diazonium compound prepared in the usual manner,
20 cc. of thiodiethylene glycol,
20 cc. of acetic acid of 50 percent strength,
50 grams of urea and starch tragacanth as thickening agent.

The fabric is then dried, washed with a hot sodium bisulfite solution and a hot dilute sodium carbonate solution, soaped for 20 minutes in the usual manner, rinsed and dried. A black print is obtained. The following table indicates a number of further components which can be used in this invention, and also the tints of the azo-dyestuffs produced from the components on the fiber.

| Diazo Component | Coupling Component | Tint |
|---|---|---|
| 2-amino-4,5-diethoxy-2'-methylsulfonyl-4'-nitro-1,1'-azobenzene. | 1-acetoacetylamino-2,5-dimethylbenzene. | reddish gray. |
| Do | 1-benzoylacetylamino-2,5-dimethoxy-4-benzoylaminobenzene. | reddish dark brown. |
| 2-amino-4,5-di-n-propoxy-2'-methylsulfonyl-4'-nitro-1,1'-azobenzene. | 2-acetoacetylamino-6-ethoxybenzthiazole. | covered green. |
| Do | 1-acetoacetylamino-2,5-dimethoxy-4-chlorobenzene. | brownish garnet. |
| Do | 1-acetoacetylamino-2,5-dimethylbenzene. | reddish gray brown. |
| Do | 1-benzoylacetylamino-2,5-dimethoxy-4-benzoylaminobenzene. | red-brown. |
| 2-amino-4-ethoxy-5-methoxy-2'-methylsulfonyl-4'-nitro-1,1'-azobenzene. | 2-acetoacetylamino-6-ethoxybenzthiazole. | dull green. |
| Do | 1-acetoacetylamino-2,5-dimethoxy-4-chlorobenzene. | gray-brown. |
| Do | 1-acetoacetylamino-2,5-dimethylbenzene. | bluish garnet. |
| Do | 1-benzoylacetylamino-2,5-dimethoxy-4-benzoylaminobenzene. | dark brown. |

We claim:
1. Azo-dyestuffs insoluble in water corresponding to the following general formula

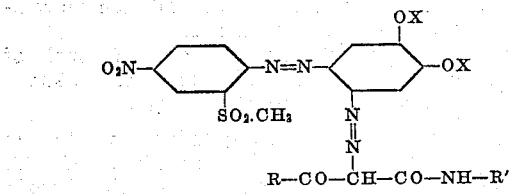

wherein X represents a lower alkyl group containing from 1 to 3 carbon atoms, R represents a member selected from the group consisting of methyl and phenyl, and R' stands for a member selected from the group consisting of radicals of the benzene and benzthiazole series.

2. The azo-dyestuff of the following formula

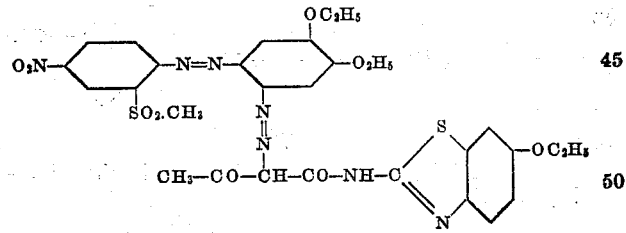

3. The azo-dyestuff of the following formula

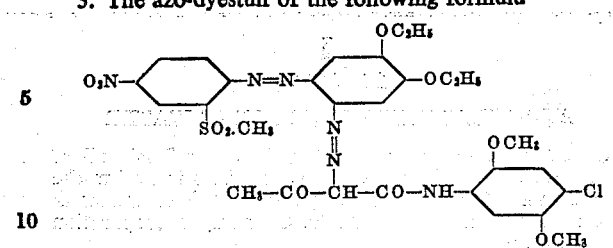

4. The azo-dyestuff of the following formula

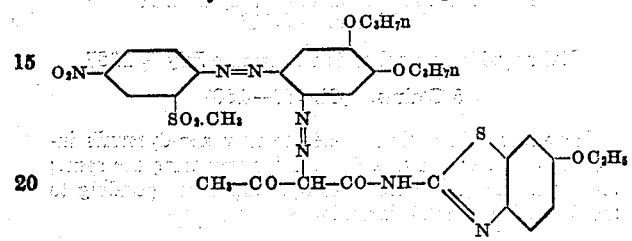

5. The azo-dyestuff of the following formula

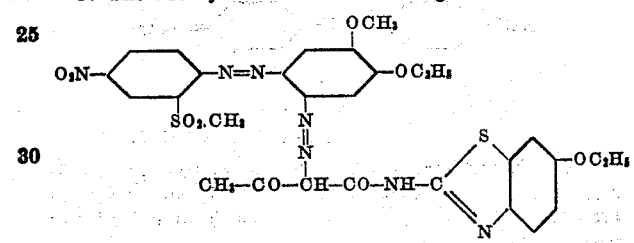

6. The azo-dyestuff of the following formula

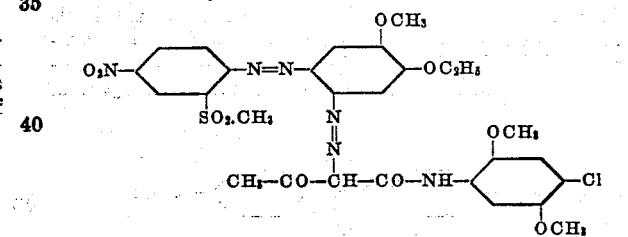

References Cited in the file of this patent
UNITED STATES PATENTS
2,783,225    Langbein _____ Feb. 26, 1957

FOREIGN PATENTS
832,179    Germany _____ Feb. 21, 1952